Patented June 11, 1929.

1,716,527

UNITED STATES PATENT OFFICE.

ERNEST MARTIN, OF AIX, FRANCE.

MANUFACTURING PROCESS FOR ALUMINOUS CEMENTS.

No Drawing. Application filed April 27, 1926, Serial No. 105,016, and in France April 30, 1925.

The different processes hitherto employed for the manufacture of aluminous cements consist in burning mixtures of aluminous materials with lime.

The burning is accomplished either by melting, or by clinkerizing or otherwise avoiding the melting point.

The object of the invention is to provide a process which consists in the incorporation in the known mixture of alumina and lime of a small quantity of certain salts adapted to facilitate the formation of hydraulically binding products.

The salts to be utilized in this case are: alkaline salts, calcium chloride, calcium fluoride and cryolite.

In the alkaline salts viz, chlorides, sulphates, carbonates, silicates and aluminates, sodium chloride is the salt of this class which may be most economically employed and it may be replaced by brine solutions.

The substances utilizable and containing aluminum oxide for the manufacture of aluminous cements are the bauxites and the residues from aluminum works.

The reactions, in presence of the added salts are complete and rapid, thus burning the mixture without bringing it to the melting point. It is also possible to burn while melting or clinkerizing or avoiding any melting.

When during the burning alkaline salts are used, mixed aluminates, calcic and alkaline, constituting perfect hydraulic products are produced.

The alkaline salts retard the melting, because aluminates containing alkalis are not so fusible as the simple calcic aluminates. In other words, by reason of the addition of alkaline salts to the initial mixture, the fusion of the mass takes place at a higher temperature because of the formation of aluminates containing sodium, it being well known that sodium aluminates are infusible at temperatures used in the manufacture of aluminous cement.

By the employment of calcium chloride, or preferably fluoride it is possible to easily obtain the clinkerization which is very difficult to obtain without the use of said salts. The clinkers are not hard to crush and give after pulverization a very rapidly binding cement in which the hydration of the whole is complete, without leaving inert particles as happens with melted cements.

The nature and proportion of the salt may change and it is stated that the salts may be used separately or as a mixture.

As an example the two following compositions are given:

First composition: bauxite 100 kg., lime 100 kg., sea salt 5 to 10 kg.

Second composition: bauxite 100 kg., lime 100 kg., calcium fluoride 5 to 10 kg.

The materials are crushed and thoroughly mixed with or without water.

The burning is done in any oven, smelting, clinkerizing or preventing the mixture from reaching the melting point.

By means of the incorporated salts it is possible to obtain in a single burning below the melting point aluminous cements of a clear color which harden very rapidly.

The color of cements, clinkerized or melted changes from light gray to black-gray, the binding being then slower than in the case of unmelted cements.

By incorporating in the mixtures a sufficient quantity of lime to obtain ferric hydraulically binding products and without reaching the melting point, the cement is richer in hydraulically binding products as disclosed for instance in U. S. Patent No. 1,586,099, May 25, 1926.

The added salts equally facilitate the reactions in this case and a single burning is enough.

The aluminous cements prepared as above described produce mortars which are not decomposed by sea water or hard waters. Mortars obtained with unmelted cements may be dipped a few minutes after preparation.

I declare that what I claim is:—

1. In the manufacture of aluminous cement, the step of incorporating as a catalyzer a small proportion at least of an alkaline salt to the aluminous cement forming mixture before heating the same whereby the formation of hydraulic aluminates is facilitated.

2. In the manufacture of aluminous cement, the step of incorporating with the aluminous cement forming mixture before heating of a catalyzer consisting of a small proportion at least of alkaline haloid whereby to facilitate formation of hydraulic aluminates.

3. In the manufacture of aluminous cement, the step of incorporating with the aluminous cement forming mixture before heating of a catalyzer consisting of a small proportion at least of an alkaline chloride whereby to facilitate formation of hydraulic aluminates.

4. In the manufacture of aluminous cement, the step of incorporating with the aluminous cement forming mixture before heating of a catalyzer consisting of a small proportion at least of chloride of soda whereby to facilitate formation of hydraulic aluminates.

In testimony whereof I have signed my name to this specification.

ERNEST MARTIN.